(12) United States Patent
Rijnveld et al.

(10) Patent No.: US 12,467,743 B2
(45) Date of Patent: Nov. 11, 2025

(54) OPTICAL SENSING DEVICE FOR MEASURING DEFORMATION OF A SAMPLE

(71) Applicant: OPTICS11 B.V., Amsterdam (NL)

(72) Inventors: Niek Rijnveld, Amsterdam (NL); Grzegorz Gruca, Amsterdam (NL); Kevin Bielawski, Amsterdam (NL); Massimiliano Berardi, Amsterdam (NL)

(73) Assignee: OPTICS11 B.V., Amsterdam (NL)

(*) Notice: Subject to any disclaimer, the term of this patent is extended or adjusted under 35 U.S.C. 154(b) by 205 days.

(21) Appl. No.: 18/276,948

(22) PCT Filed: Feb. 21, 2022

(86) PCT No.: PCT/EP2022/054291
§ 371 (c)(1),
(2) Date: Aug. 11, 2023

(87) PCT Pub. No.: WO2022/175537
PCT Pub. Date: Aug. 25, 2022

(65) Prior Publication Data
US 2024/0295395 A1   Sep. 5, 2024

(30) Foreign Application Priority Data
Feb. 19, 2021   (NL) .................................. 2027604

(51) Int. Cl.
*G01B 11/16*   (2006.01)
*G01B 9/02001*   (2022.01)
(Continued)

(52) U.S. Cl.
CPC .......... *G01B 11/161* (2013.01); *G01B 9/0201* (2013.01); *G01B 11/18* (2013.01);
(Continued)

(58) Field of Classification Search
CPC ....... G01B 11/161; G01B 11/18; G01L 1/245; G01L 9/0079; G01D 5/35312
See application file for complete search history.

(56) References Cited

U.S. PATENT DOCUMENTS 9,766,099 B2 * 9/2017 Pechstedt ........... G01K 11/3206
9,810,594 B2 * 11/2017 Sanzari ................ G01L 9/0079

FOREIGN PATENT DOCUMENTS

CN   110196071 A * 9/2019
KR   100367297 B1 * 1/2003
(Continued)

OTHER PUBLICATIONS

Stellman C M et al, "A fiber-optic pipette for rapid long-pathlength capillary spectroscopy", Sensors and Actuators B: Chemical, Elsevier BV, NL, vol. 46, No. 1, Jan. 15, 1998 (Jan. 15, 1998), p. 56-60, XP004128035.
(Continued)

*Primary Examiner* — Michael A Lyons
(74) *Attorney, Agent, or Firm* — KARCESKI IP LAW, PLLC (57) ABSTRACT

An optical sensing device includes a support with an aperture. The optical sensing device can removably hold a sample against the support around the aperture. Accordingly, a portion of the sample is free to deform through the aperture in response to a change in an environmental condition. An optical waveguide is fixedly arranged with respect to the support whereby an end of the optical waveguide faces the aperture. The end of the optical waveguide forms an optical interferometric cavity with a refractive index discontinuity at a surface of the portion of the sample that is free to deform through the aperture.

15 Claims, 4 Drawing Sheets

(51) Int. Cl.
    *G01D 5/353* (2006.01)
    *G01L 1/24* (2006.01)
    *G01L 9/00* (2006.01)
(52) U.S. Cl.
    CPC .......... *G01D 5/35312* (2013.01); *G01L 1/245* (2013.01); *G01L 9/0079* (2013.01)

(56) References Cited

FOREIGN PATENT DOCUMENTS

WO  2017077138 A1  5/2017
WO  2020149739 A1  7/2020

OTHER PUBLICATIONS

Carlos Moreno-Hernadez et al, "Single tapered fiber tip for simultaneous measurements of thickness, refractive index and distance to a sample", Optics Express, vol. 23, No. 17, Aug. 24, 2015 (Aug. 24, 2015), p. 22141, XP055228210.

González-Bermúdez Blanca et al, "Advances in Micropipette Aspiration: Applications in Cell Biomechanics, Models, and Extended Studies", Biophysical Journal, vol. 116, No. 4, Feb. 19, 2019 (Feb. 19, 2019), p. 587-594, XP085605747.

International Preliminary Report on Patentability dated May 3, 2023, for International Patent Application No. PCT/EP2022/054291.

International Search Report dated May 13, 2022, for International Patent Application No. PCT/EP2022/054291.

Thurner Klaus et al, "Fabry-Pérot interferometry for long range displacement sensing", Review of Scientific Instruments, vol. 84, No. 9, Sep. 1, 2013 (Sep. 1, 2013), p. 095005, XP055850152.

Thurner Klaus: "Position sensing using a fiber-optic Fabry-Perot interferometer," May 14, 2018 (May 14, 2018), XP093012981.

* cited by examiner

3
OPTICAL SENSING DEVICE FOR MEASURING DEFORMATION OF A SAMPLE

CROSS-REFERENCE TO RELATED APPLICATION(S)

This is a National Stage Entry into the United States Patent and Trademark Office from International Patent Application No. PCT/EP2022/054291, filed on Feb. 21, 2022, which relies on and claims priority to Netherlands Patent Application No. 2027604, filed on Feb. 19, 2021, the entire contents of both of which are incorporated herein by reference.

FIELD OF THE INVENTION

An aspect of the invention relates to an optical sensing device that can measure deformation of a sample in response to a change in an environmental condition. The sample may be biological, such as, for example, a cell, biomimetic, or synthetic. The deformation may provide information on a mechanical property of the sample. Other aspects of the invention relate to an optical measurement system, and a method of optically measuring a response of a sample to a change in an environmental condition.

BACKGROUND ART

Micropipette aspiration is a technique for measuring mechanical properties of a sample, in particular a biological sample, such as, for example, a cell. In this technique, the sample contacts a tip of a micropipette, which may have a radius comprised between, for example, 1 micron and 1 mm. A suction pressure inside the micropipette causes a portion of the sample to be drawn into the micropipette. As a result, the sample deforms to a degree that varies as a function of the suction pressure. A mechanical property of the sample, such as, for example, an elastic modulus, can be determined based on a measured stimulus-response relationship between a change in the suction pressure and a resulting displacement of the portion of the sample that has been aspired in the micropipette.

A microscope camera can be used to track the displacement of the portion of the sample that has been aspired in the micropipette as well as, more generally, deformation of the sample. Image analysis then allows quantifying this displacement and thus measuring the stimulus-response relationship with the change in suction pressure.

For example, the article entitled "Advances in Micropipette Aspiration: Applications in Cell Biomechanics, Models, and Extended Studies" by González-Bermúdez et al. published in the Biophysical Journal 116, pp. 587-594, Feb. 19, 2019 describes that in micropipette-aspiration experiments, a suction pressure is applied by connecting the micropipette (microcapillary) to an adjustable water reservoir or a pump. Cell changes are determined microscopically by means of image analysis. The suction pressure is given by the height difference between the tip of the micropipette and the top of the reservoir h and the specific weight of water. If there is a flow, the pressure drop along the microcapillary must be taken into account.

However, this image-based tracking of sample deformation presents several drawbacks. First of all, the image analysis that is required may be computationally demanding and, therefore, relatively slow. This may make that a significant amount of time is required to conduct a single experiment. Moreover, the image analysis may require relatively costly hardware and software.

Another drawback of image-based tracking is that relatively small deformations, and thus relatively small displacements, may be difficult to quantify. Deformations may be considered as being relatively small if, for example, a ratio of the displacement into the micropipette with respect to the radius of the tip of the micropipette is less than 0.001. Quantifying these relatively small deformations may be of interest, for example, in studying the role of different internal components of a cytoskeleton on cellular mechanical properties. However, in practice, microscope cameras generally have a pixel size that is too large to capture these relatively small deformations with sufficient precision. That is, image resolution may be insufficient. What complicates matters is that subpixel detection algorithms, which may potentially increase resolution, require negligible drift and a precise parallelism between a plate supporting the sample and the micropipette to avoid projection errors.

SUMMARY OF THE INVENTION

There is a need for a technique for measuring deformation of a sample, in response to a change in an environmental condition, that allows an improvement in at least one of the following aspects: resolution, speed, ease-of-use and cost.

An aspect of the invention provides for an optical sensing device comprising:
  a support with an aperture, the optical sensing device being adapted to removably hold a sample against the support around the aperture so that a portion of the sample is free to deform through the aperture in response to a change in an environmental condition; and
  an optical waveguide fixedly arranged with respect to the support whereby an end of the optical waveguide faces the aperture so that the end is adapted to form an optical interferometric cavity with a refractive index discontinuity at a surface of the portion of the sample that is free to deform through the aperture.

A further aspect of the invention provides for an optical measurement system comprising:
  an optical sensing device as defined hereinbefore; and
  an optical interrogator adapted to measure a spectral response of the optical interferometric cavity in the optical sensing device, to detect a periodicity in the spectral response that has been measured, and to derive an optical path length in the optical interferometric cavity from the periodicity that has been detected in the spectral response.

Yet a further aspect of the invention provides for method of optically measuring a response of a sample to a change in an environmental condition to which the sample is exposed, the method comprising:
  using an optical sensing device as defined hereinbefore to form an optical interferometric cavity between, one the one hand, the end of the optical waveguide and, on the other hand, a refractive index discontinuity at a surface of a portion of the sample that is free to protrude through the aperture, the optical interferometric cavity having an optical path length; and
  measuring a variation in the optical path length of the optical interferometric cavity.

In each of these aspects, the invention allows a significantly higher resolution with which deformation can be measured compared with the image-based tracking described hereinbefore. Namely, a variation in optical path length in the optical interferometric cavity can be detected with a resolution that may be several orders of magnitude higher than the resolution achievable with image-based tracking. Moreover, the change in the environmental condition, which causes the deformation of the sample, may also be detected by means of another interferometric cavity designed for that purpose. This then allows precise time matching between variations in the environmental conditions and variations in the deformation in response thereto. This contributes to measurement precision and accuracy. Moreover, it allows real-time monitoring of a stimulus-response relationship between these variations.

A further advantage of the invention is that measurements can be carried out in a simpler manner, more easily, and thus at lower cost. This is because the sample need not necessarily be precisely positioned with respect to a microscope camera, or another type of tracking device. In fact, the sample need not require a specific fixation or preparation; the sample may even be free-floating, as it were. In contrast, in the image-based tracking described hereinbefore, the sample should be perpendicular to a virtual line extending between a lens center of the microscope camera and a support holding the sample. In practice, this requirement also puts constraints on a measurement setup: the micropipette should be oriented horizontally with respect to the sample. These constraints may complicate making measurements, which may be relatively time consuming, adversely affecting throughput of measurements to be carried out.

What further contributes to lower cost and ease of use is that the invention provides measurement results that can be represented by a relatively small amount of data. The measurement results may be, for example, in the form of a table specifying respective optical path lengths measured at respective instants. A relatively small data file may comprise such a measurement table. In contrast, the image-based tracking described hereinbefore, requires storing and handling relatively large image files. Moreover, real-time monitoring of the stimulus-response relationship as mentioned hereinbefore, requires hardware and software capable of processing these image files sufficiently fast.

For the purpose of illustration, some embodiments of the invention are described in detail with reference to accompanying drawings. In this description, additional features will be presented, some of which are defined in the dependent claims, and advantages will be apparent.

DESCRIPTION OF SOME EMBODIMENTS

Figure 1:
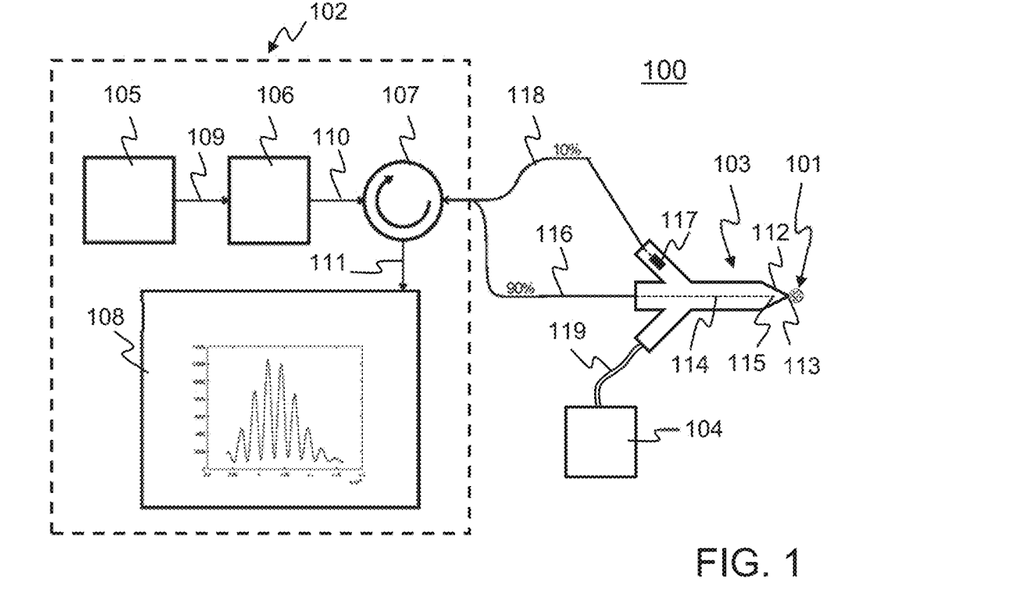
FIG. 1 is a schematic block diagram of an optical measurement system that can measure deformation of a sample in response to a change in pressure.

FIG. 1 schematically illustrates an optical measurement system 100 that can measure deformation of a sample 101 in response to a change in pressure. FIG. 1 provides a schematic block diagram of the optical measurement system 100 with the sample 101 to be analyzed. The sample 101 may be biological, such as, for example, a cell, biomimetic, or synthetic. By measuring the deformation of the sample 101 in response to a change in pressure, information about mechanical properties of the sample 101 can be obtained. This information may concern, for example, an elastic modulus of the sample 101.

The optical measurement system 100 comprises an optical interrogator 102, an optical sensing device 103, and a syringe pump 104 (also referred to as "an actuator"). In this embodiment, the optical interrogator 102 comprises a light source 105, a depolarizer 106, a circulator 107, and a spectrometer-based analyzer 108. A polarization-maintaining optical fiber 109 may optically couple the light source 105 to the depolarizer 106. A single mode optical fiber 110 may couple the depolarizer 106 to the circulator 107. Another single mode fiber 111 may couple the spectrometer-based analyzer 108 to the circulator 107.

The light source 105 may be in the form of, for example, a super-luminescent diode. In an experimental embodiment, the super-luminescent diode had a center wavelength of 1550 nm, a full-width-at-half maximum bandwidth of 50 nm, and provided 21 mW light power. The spectrometer-based analyzer 108 may comprise a spectrometer and a spectral analysis arrangement as described in patent publication WO2017077138A1, which is also in the name of the present applicant. In the experimental embodiment, the spectrometer had a wavelength range of 1510 to 1595 nm, and an optical resolution of 498 μm.

The optical sensing device 103 may be in the form of a micropipette and will be referred to hereinafter as micropipette 103 for the sake of convenience and illustration. The micropipette 103 has a tip 112 with an aperture 113, which will be referred to as tip aperture 113 hereinafter. The sample 101 to be analyzed is in contact with the tip 112 and, more precisely, with the tip aperture 113. The micropipette 103 may comprise a hollow interior that is filled with a fluid, such as, for example, water. The hollow interior may extend to tip aperture 113. Accordingly, the sample 101 may be in contact with the fluid.

An optical fiber 114 is concentrically arranged in the micropipette 103 and extends into the tip 112 thereof. A free end 115 of the optical fiber 114 may be aligned with the tip aperture 113. To that end, the micropipette 103 may comprise a support for the optical fiber 114 so as to prevent the free end 115 thereof from significantly bending. The optical fiber in the micropipette 103 will be referred to hereinafter as sample measurement fiber 114 for the sake of convenience. The sample measurement fiber 114 may be an extension of an optical fiber 116 that provides, at least partially, optical coupling with the circulator 107.

The micropipette 103 further comprises an optical pressure sensor 117. A separate optical fiber 118 optically couples the optical pressure sensor 117 to the circulator 107. The micropipette 103 is fluidically coupled to the syringe pump 104. For that purpose, a conduit 119 of relatively small diameter may extend from the micropipette 103 to the syringe pump 104.

Figure 2:
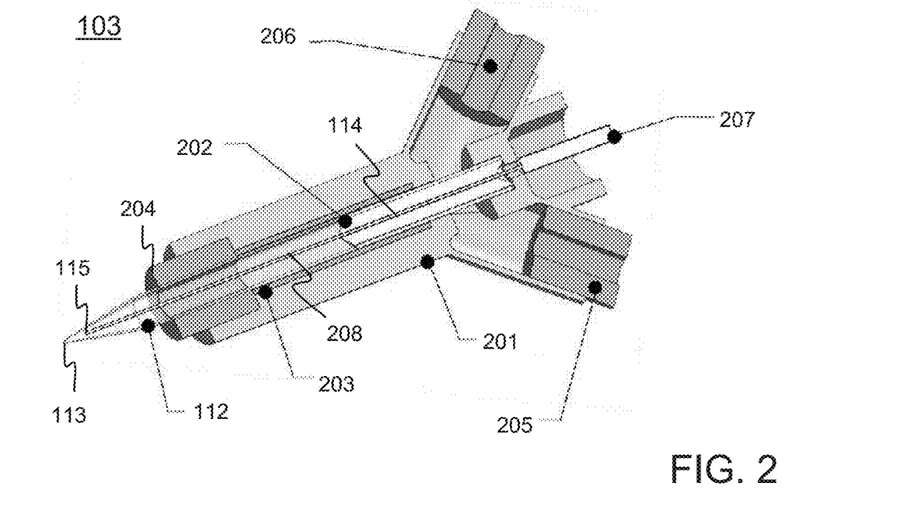
FIG. 2 is a schematic perspective cross-sectional diagram of a micropipette in the optical measurement system.

FIG. 2 schematically illustrates an embodiment of the micropipette 103. FIG. 2 provides a schematic perspective cross-sectional diagram of this embodiment, which will be referred to hereinafter as the micropipette 103 for reasons of convenience. The micropipette 103 comprises the sample measurement fiber 114 with its free end 115 and the tip 112 with the tip aperture 113 mentioned hereinbefore with reference to FIG. 1. The optical pressure sensor 117 is not represented in FIG. 2 for the sake of simplicity and convenience.

The micropipette 103 further comprises a housing 201, a ferrule 202, a mating sleeve 203, a mounting gasket 204, two sealing gaskets 205, 206, and a tubing member 207. The housing 201 may be made of, for example, resin material. The ferrule 202 and the mating sleeve 203 may be made of, for example, ceramic material. The tip 112 may be made of, for example, glass. Specifically, the tip 112 of the micropipette 103 may be a glass suction capillary.

The housing 201 has a center opening, which is relatively small, and two lateral openings. The sample measurement fiber 114 passes through the relatively small center opening of the housing 201. The sample measurement fiber 114 may be secured to the housing 201 by means of, for example, glue at the center opening. The tubing member 207, which is exterior of the housing 201 at the center opening thereof, envelopes the sample measurement fiber 114. The tubing member 207 may provide strain relief for the sample measurement fiber 114 and sealing additional to that of the glue.

The housing 201 has a hollow interior that is shaped to accurately position the ferrule 202 and the mating sleeve 203 within the housing 201. The sample measurement fiber 114 concentrically passes through the ferrule 202 and the mating sleeve 203. The ferrule 202 constitutes a support for the sample measurement fiber 114. A portion of the mating sleeve 203 overlaps a portion of the ferrule 202 as illustrated in FIG. 2. Another, complementary portion of the mating sleeve 203 overlaps a portion of the tip 112 of the micropipette 103. The tip 112 of the micropipette 103 abuts against a chamfered end of the ferrule 202. The mounting gasket 204 secures the tip 112 to the housing 201.

The tip 112 of the micropipette 103 may have a largest outer diameter that is slightly less than an inner diameter of the mating sleeve 203. For example, the largest outer diameter of the tip 112 of the micropipette 103 may be 1.2 mm whereas the inner diameter of the mating sleeve 203 may be 1.25 mm. In such a case, there is a cylindrical clearance gap between the mating sleeve 203 and the tip 112. The portion of the tip 112 that is enveloped by the mating sleeve 203 may then be at least partially provided with a bridging sleeve. The bridging sleeve fills the cylindrical clearance. The bridging sleeve may comprise elastic material such as, for example, silicone. This contributes to a satisfactory co-centricity between the sample measurement fiber 114 in the micropipette 103 and the tip 112 of the micropipette 103.

An end portion 208 of the sample measurement fiber 114 pokes out of the ferule This end portion 208 may thus bend to a certain extent. Such bending adversely affects concentricity and may thus cause misalignment of the free end 115 of the sample measurement fiber 114 with respect to the tip aperture 113. The micropipette 103 illustrated in FIG. 2 has a structure that allows the tip 112 to be relatively short. The end portion 208 of the sample measurement fiber 114 that pokes out of the ferrule 202 may thus also be relatively short. This contributes to satisfactory co-centricity between the end portion 208 of the sample measurement fiber 114 and the tip aperture 113 and counters misalignment. In an experimental embodiment, bending deformation was found to be smaller than 8 µm for a fiber curl radius of 4 m.

The ferrule 202 comprises longitudinal slits on an outer surface. These slits are not represented in FIG. 2 for the sake of simplicity. The slits provide adequate fluid communication between the tip 112 of the micropipette 103 and a back section of its hollow interior where the two lateral openings are located. The slits may be approximately 300 µm deep, for example. The slits may be engraved by means of, for example, a diamond wire cutter.

A lateral opening of the housing 201 may receive the conduit 119 illustrated in FIG. 1, which fluidically couples the micropipette 103 to the syringe pump 104. The conduit 119 may be held by a sealing gasket 205 arranged in this opening. Another lateral opening of the housing 201 may receive the optical pressure sensor 117 illustrated in FIG. 1. A sealing gasket 206 arranged in this lateral opening may serve as a sleeve in which the optical pressure sensor 117 may be inserted.

The free end 115 of the sample measurement fiber 114, which faces the tip aperture 113, may comprise an optical lens. The optical lens may be formed by a graduated refractive index at the free end 115 of the sample measurement fiber 114. The optical lens may focus a light beam emanating from the sample measurement fiber 114 on the tip aperture 113 and thus on a portion of a sample that is within the tip aperture 113. The light beam may have a profile having a narrow portion, which is commonly referred to as beam waist, that is proximate to the tip aperture 113. This contributes to achieving a satisfactory signal-to-noise ratio with the optical interrogator 102 illustrated in FIG. 1. In practice, a compromise may need to be made between achieving a beam waist with a relatively small diameter, on the one hand, and locating the beam waist sufficiently close to the tip aperture 113, on the other hand.

The sample measurement fiber 114 may be an assembly of various optical fiber sections that have been joined to each other by splicing. For example, in an experimental embodiment, the sample measurement fiber 114 comprised three sections that were spliced together: a back fiber section, which is furthest away from the tip aperture 113, a middle fiber section, and a front fiber section, which comprises the free end 115 that faces the tip aperture 113. The back fiber may be formed by a 9/125 µm single mode optical fiber. This optical fiber may poke out from the micropipette 103 and be provided with a connector that allows coupling the optical fiber to the optical interrogator 102 illustrated in FIG. 1. That is, the back section may be an extension of the optical fiber 116 illustrated in FIG. 1, which optically couples the micropipette 103 with the optical interrogator 102. The middle section may be formed by a 300 µm long coreless fiber of that also has a diameter of 125 µm. The front section may be formed by a 50/125 µm, 498-µm long GRIN multimode fiber, GRIN being an acronym for gradient index. The sample measurement fiber 114 thus formed provided 30 µm beam waist at 500 µm in water.

The micropipette 103 presented hereinbefore with reference to FIG. 2 has various advantageous properties. First of all, the micropipette 103 allows sufficiently good concentricity between the sample measurement fiber 114 therein and the tip 112, which also acts as a waveguide for light that enters the micropipette 103 through the sample measurement fiber 114. This allows efficient transfer of this entering light to the sample 101 that is in contact with the tip aperture 113 as illustrated in FIG. 1. The efficient transfer of the entering light contributes to achieving a satisfactory signal-to-noise ratio and thus contributes to achieving sufficiently accurate and precise measurement results, which may be obtained in a manner that will be described hereinafter. In addition, the micropipette 103 is sufficiently mechanically stable for obtaining consistent measurement results, allowing reliable comparison of these obtained with, for example, various samples. Moreover, the micropipette 103 allows a sufficiently efficient transfer of fluid pressure from the back section of its hollow interior, which is fluidly coupled to the syringe pump 104, to the tip 112 of the micropipette 103.

Figure 3:
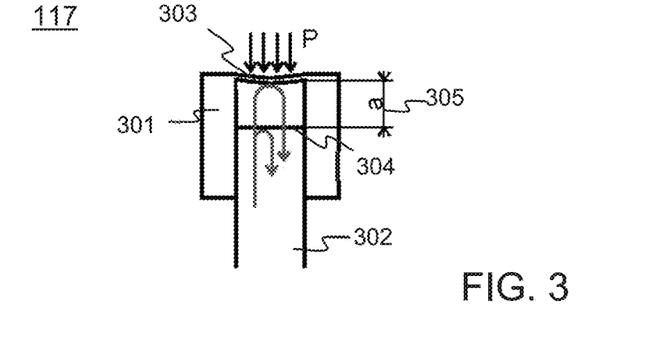
FIG. 3 is a schematic cross-sectional diagram of an optical pressure sensor in the micropipette.

FIG. 3 schematically illustrates an embodiment of the optical pressure sensor 117. FIG. 3 provides a very schematic cross-sectional view of this embodiment, which will be referred to hereinafter as the optical pressure sensor 117 for reasons of convenience. The optical pressure sensor 117 comprises a cap-like element 301 that is fitted on an end portion of an optical fiber 302. The cap-like element 301 may be, for example, a monolithic semiconductor device described in patent publication WO2020149739A1, which is also in the name of the present applicant. The optical fiber 302 on which the cap-like element 301 is fitted may be the optical fiber 118 that optically couples the optical pressure sensor 117 to the circulator 107; as illustrated in FIG. 1.

The cap-like element 301 comprises a light reflecting membrane 303 that faces an end 304 of the optical fiber 302. There is a refractive index discontinuity at the end 304 of the optical fiber 302. The light reflecting membrane 303 and the refractive index discontinuity at the end 304 of the optical fiber 302 jointly define a Fabry-Perot cavity 305. This Fabry-Perot cavity will be referred to hereinafter as the pressure-sensing Fabry-Perot cavity 305 for the sake of convenience. The pressure-sensing Fabry-Perot cavity 305 has an optical path length "a" that varies as a function of pressure exerted by the fluid in the micropipette 103 on the light reflecting membrane 303, which may bend inwardly and outwardly. This pressure is indicated by the reference "P" in FIG. 3. The optical path length "a" is thus indicative of the fluid pressure in the micropipette 103. Variations in the optical path length "a" represent pressure variations in the fluid in the micropipette 103.

Figure 4:
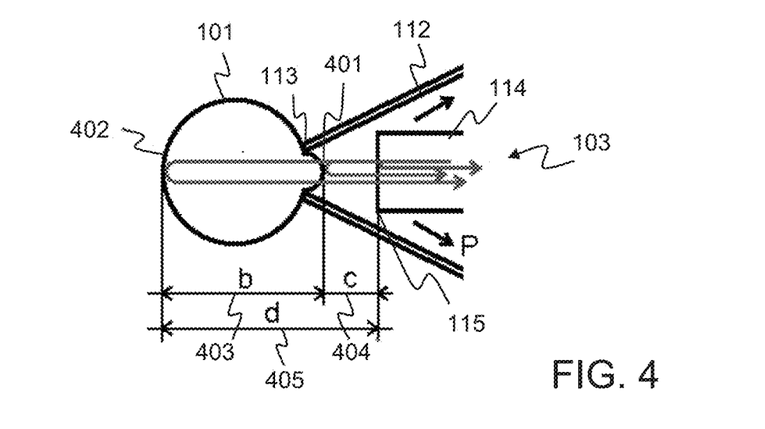
FIG. 4 is a schematic cross-sectional diagram of the sample in contact with a tip of the micropipette.

FIG. 4 schematically illustrates in greater detail the sample 101 in contact with the tip 112 of the micropipette 103. FIG. 4 provides a very schematic cross-sectional diagram of the sample 101 in contact with the tip 112 of the micropipette 103. In this illustration, the sample 101 has undergone a deformation: a portion of the sample 101 has been drawn into the tip 112 of the micropipette 103 through the tip aperture 113. This portion of the sample 101 will be referred to hereinafter as the aspirated portion for the sake of convenience. The free end 115 of the sample measurement fiber 114, which is concentrically arranged in the micropipette 103, is near to and faces the tip aperture 113. Consequently, the free end 115 of the sample measurement fiber 114 also faces the aspirated portion of the sample 101.

There are several refractive index discontinuities when the sample 101 is in contact with tip 112 of the micropipette 103 as illustrated in FIG. 4. There is a refractive index discontinuity at the free end 115 of the sample measurement fiber 114. There is a further refractive index discontinuity at a front surface 401 on the aspirated portion of the sample 101. There is yet another refractive index discontinuity at a back surface 402 of the sample 101, which is opposite to the front surface 401 on the aspirated portion of the sample 401.

The aforementioned refractive index discontinuities define several Fabry-Perot cavities. The refractive index discontinuity at the front surface 401 on the aspirated portion of the sample 101, on the one hand, and the refractive index discontinuity at the back surface 402 of the sample 101, on the other hand, jointly define a Fabry-Perrot cavity 403. This Fabry-Perot cavity will hereinafter be referred to as the cross sample Fabry-Perot cavity 403 hereinafter for the sake of convenience. The cross sample Fabry-Perot cavity 403 has an optical path length "b" that is indicative of a spacing between the front surface 401 on the aspirated portion of the sample 101 and the back surface 402 of the sample 101. This spacing will be referred to hereinafter as the cross sample spacing for the sake of convenience. The optical path length "b" corresponds with the cross sample spacing times an effective refractive index of substances in the sample 101 along a path between the front surface 401 on the aspirated portion and the back surface 402. Variations in the optical path length "b" thus represent variations in the cross sample spacing.

The refractive index discontinuity at the free end 115 of the sample measurement fiber 114, on the one hand, and the refractive index discontinuity at the front surface 401 on the aspirated portion of the sample 101, on the other hand, jointly define another Fabry-Perrot cavity 404. This Fabry-Perot cavity will hereinafter be referred to as the aspiration Fabry-Perot cavity 404 hereinafter for the sake of convenience. The aspiration Fabry-Perot cavity 404 has an optical path length "c" that is indicative of a spacing between the free end 115 of the sample measurement fiber 114 and the front surface 401 on the aspirated portion of the sample 101. This spacing will be referred to hereinafter as the aspiration spacing for the sake of convenience. The optical path length "c" corresponds with the aspiration spacing times a refractive index of the fluid in the tip 112. Variations in the optical path length "c" thus represent variations in the aspiration spacing.

The refractive index discontinuity at the free end 115 of the sample measurement fiber 114, on the one hand, and the refractive index discontinuity at the back surface 402 of the sample 101, on the other hand, jointly define yet another Fabry-Perrot cavity 405. This Fabry-Perot cavity will hereinafter be referred to as the sample back Fabry-Perot cavity 405 hereinafter for the sake of convenience. The sample back Fabry-Perot cavity 405 has an optical path length "d" that is indicative of a spacing between the free end 115 of the sample measurement fiber 114 and the back surface 402 of the sample 101. This spacing will be referred to hereinafter as the sample back spacing for the sake of convenience. The optical path length "d" corresponds with the sample back spacing times an effective refractive index of the aforementioned substances in the sample 101 and the fluid in the tip 112, which are present along a path between the free end 115 of the sample measurement fiber 114 and the back surface 402 of the sample 101. Variations in the optical path length "d" thus represent variations in the sample back spacing.

It should be noted that FIG. 4 is a very schematic representation that is not drawn to scale. Proportions between the aforementioned optical path lengths "b", "c", and "d" do not necessarily correspond with what FIG. 4 suggests. For example, the optical path length "b" of the cross sample Fabry-Perot cavity 403 may be longer than the optical path length "c" the aspiration Fabry-Perot cavity 404 although FIG. 4 suggests otherwise.

The optical measurement system 100 illustrated in FIG. 1 basically operates as follows. The syringe pump 104 makes that the fluid in the micropipette 103 has an under-pressure: a pressure that is lower than that exerted on a major part of the sample 101, which is not within the tip aperture 113 and thus not in contact with the fluid in the micropipette 103. As a result, a portion of the sample 101 that is within the tip aperture 113, and thus in contact with the fluid, is drawn into the tip 112 of the micropipette 103 as illustrated in FIG. 4. The portion of the sample 101 that is drawn into the tip 112 will be referred to hereinafter as the aspired portion for the safe of convenience. The aspired portion is thus a deformation of the sample 101 in response to the under-pressure.

In addition, the syringe pump 104 may induce variations in the under pressure, which is the pressure of the fluid in the micropipette 103. These pressure variations may have an oscillating character. The aspired portion of the sample 101 undergoes the pressure variations. In response, this may cause variations in the deformation of the sample 101: the aspired portion varies in length. Consequently, the aforementioned aspiration spacing and, therefore, the optical path length "c" will vary with the pressure variations. The same may apply to the aforementioned cross sample spacing, and the sample back spacing and, therefore, the optical path lengths "b" and "c", respectively.

The optical interrogator 102 measures the aforementioned optical path lengths "a", "b", "c" and "d", as well as the variations therein. The optical path length "a" of the pressure-sensing Fabry-Perot cavity 305, which is represented in FIG. 3, indicates the under-pressure, as well as the variations therein. The optical path lengths "b", "c", and "d", of the cross sample Fabry-Perot cavity 403, of the aspiration Fabry-Perot cavity 404, and of the sample back Fabry-Perot cavity 405, respectively, which are represented in FIG. 4, indicate the deformation that the sample 101 undergoes in response to the under-pressure, as well as, the variations therein.

In order to measure the aforementioned optical path lengths "a", "b", "c" and "d", as well as the variations therein, the optical interrogator 102 may operate in a manner similar to that described in the patent publication WO2017077138A1, mentioned hereinbefore. This operation will be summarily described hereinafter in the context of the optical measurement system 100 illustrated in FIG. 1.

The optical interrogator 102 injects light into the sample measurement fiber 114 and into the optical pressure sensor 117, both incorporated in the micropipette 103. The light may have a center wavelength of 1550 nm, and be relatively broad band having a full-width-at-half maximum bandwidth of 50 nm, as mentioned hereinbefore. A larger portion of the light may be injected into the sample measurement fiber 114, whereas a smaller portion of the light may be injected into the optical pressure sensor 117. In FIG. 1, this is indicated by means of percentages, 90% and 10%, respectively, which are presented by way of illustration only; different percentages may be suitable.

In response, the optical interrogator 102 receives reflected light from the micropipette 103. The reflected light is a combination of reflected light from the sample measurement fiber 114 and reflected light from the optical pressure sensor 117. The circulator 107 directs the reflected light to the spectrometer-based analyzer 108. The spectrometer-based analyzer measures a wavelength spectrum of the reflected light in a wavelength band of interest. The wavelength band of interest may be centered on the aforementioned center wavelength of 1550 nm and have a width similar to the aforementioned full-width-at-half maximum bandwidth of 50 nm.

The wavelength spectrum of the reflected light reveals a combined spectral response, which is a combination of respective spectral responses of respective Fabry-Perot cavities in the micropipette 103. These respective Fabry-Perot cavities comprise the pressure-sensing Fabry-Perot cavity 305, represented in FIG. 3, the cross sample Fabry-Perot cavity 403, the aspiration Fabry-Perot cavity 404, and the sample back Fabry-Perot cavity 405, represented in FIG. 4. A spectral response of a Fabry-Perot cavity, which has an optical path length, is typically a sinusoidal curve of amplitude versus wavelength. This sinusoidal curve has a periodicity that is determined by the optical path length of the Fabry-Perot cavity.

The spectrometer-based analyzer 108 applies a Fourier transform to the wavelength spectrum that has been measured. The Fourier transform thus provides a Fourier-transformed wavelength spectrum. The Fourier transform may be complex so that an amplitude representation of the Fourier-transformed wavelength spectrum is provided, as well as a phase representation of the Fourier-transformed wavelength spectrum. In each of these representations, periodicity is linearly related to optical path length. Thus, periodicity and optical path length are interchangeable in the Fourier-transformed wavelength spectrum.

Figure 5:
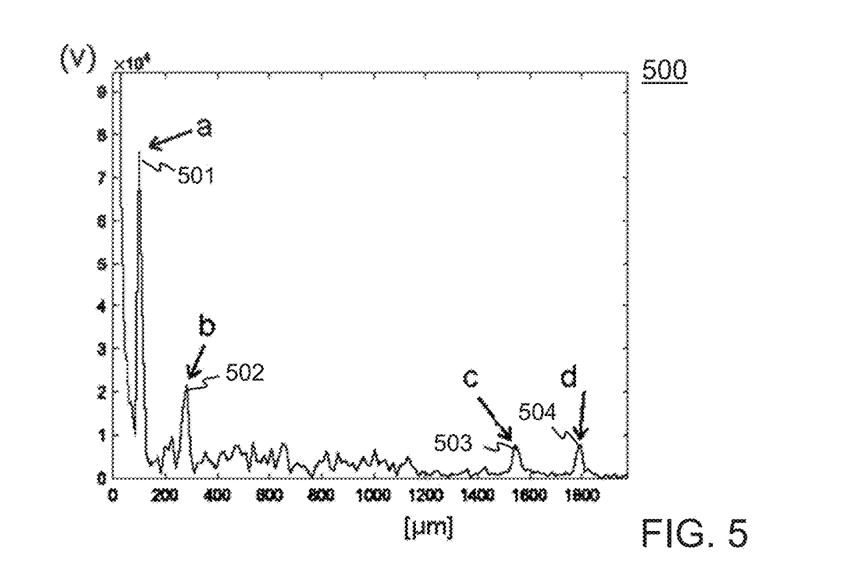
FIG. 5 is a graph of a Fourier-transformed wavelength spectrum obtained by a spectral response measurement in the optical measurement system.

FIG. 5 illustrates an amplitude representation of a Fourier-transformed wavelength spectrum 500, which may be obtained by a spectral response measurement described hereinbefore. FIG. 5 is a graph having a horizontal axis, which represents optical path length in units of micron [μm], and a vertical axis, which represents amplitude (V). A curve in the graph represents the amplitude representation of the Fourier-transformed wavelength spectrum 500. The Fourier-transformed wavelength spectrum 500 comprises four peaks: a first peak 501 at approximately 100 μm on the horizontal axis, a second peak 502 at approximately 250 μm, a third peak 503 at approximately 1550 μm, and a fourth peak 504 at approximately 1800 μm.

The first peak 501 is related to the pressure-sensing Fabry-Perot cavity 305 of which the optical path length "a" is nominally approximately 100 μm. The second peak 502 is related to the cross sample Fabry-Perot cavity 403 of which the optical path length "b" is nominally approximately 250 μm. The third peak 503 is related to the aspiration Fabry-Perot cavity 404 of which the optical path length "c" is nominally approximately 1550 μm. The fourth peak 504 is related to the sample back Fabry-Perot cavity 405 of which the optical path length "d" is nominally approximately 1800 μm. For each of these peaks, it holds that the peak has a position on the horizontal axis that represents a measured optical path length of the Fabry-Perot cavity to which the peak is related.

The optical interrogator 102 can repeatedly carry out spectral response measurements, each as previously described, in successive time intervals. Accordingly, the spectrometer-based analyzer 108 then measures successive wavelength spectra in these successive time intervals. As explained hereinbefore, a wavelength spectrum comprises a spectral response of a Fabry-Perot cavity, which has an optical path length. The spectral response of the Fabry-Perot cavity manifests itself as a periodicity in the wavelength spectrum, whereby the periodicity depends on the optical path length. The spectrometer-based analyzer 108 may detect a change in the periodicity over the successive time intervals in which the spectral response measurements have been carried out. The optical interrogator 102 may then derive a change in the optical path length from this change in the periodicity.

High resolutions measurements of optical path length variations are possible by detecting a phase evolution of the periodicity in the successive wavelength spectra that have been measured. This technique is described in patent publication WO2017077138A1, mentioned hereinbefore. In the optical measurement system 100 illustrated in FIG. 1, the spectrometer-based analyzer 108 may use successive phase representations of successive Fourier-transformed wavelength spectra that have been measured. The spectrometer-based analyzer 108 may extract local phase data from each of the successive phase representations at a location corresponding to a location in an amplitude representation of a Fourier-transformed wavelength spectrum where a peak occurs. Accordingly, a series of local phase date is obtained for the peak concerned, which are related in time to the successive time intervals in which the successive spectral response measurements have been carried out. The series of local phase date represents the phase evolution of the periodicity with relatively great precision, which, in turn, represents optical path length variations with relatively great precision.

Accordingly, the optical interrogator 102 may measure with relatively great precision variations in the optical path length "a" of the pressure-sensing Fabry-Perot cavity 305 illustrated in FIG. 3, as well as variations in the optical path length "c" of the aspiration Fabry-Perot cavity 404 illustrated in FIG. 4. The thus measured variations in the optical path length "a" represent pressure variations with relatively great precision. The thus measured variations in the optical path length "c" represent variations in the aspiration spacing, and thus deformation of the sample 101, with relatively great precision. Moreover the optical interrogator 102 detects these variations in an inherently synchronized manner. This allows measuring with relatively great precision a stimulus-response relationship between the pressure variations, which constitute the stimulus, and the variations in the aspiration spacing, which constitutes the response.

The optical interrogator 102 may further measure variations in the optical path length "b" of the cross sample Fabry-Perot cavity 403 and variations in the optical path length "d" of the sample back Fabry-Perot cavity 405 illustrated in FIG. 4. The aforementioned remarks equally apply to these measured variations, which may further characterize sample deformation.

As illustrated in FIG. 5, the third peak 503 and the fourth peak 504, which are related to the optical path lengths "c" and "d", respectively, are less pronounced, having a smaller amplitude compared with the first peak 501 and the second peak 502. This is related to a lower signal-to-noise ratio of reflected light from the related cavities: the aspiration Fabry-Perot cavity 404 and the sample back Fabry-Perot cavity 405, respectively, illustrated in FIG. 4. The signal-to-noise ratio depends on optical and geometrical properties of the sample 101, as well as on the profile of the light beam emanating from the sample measurement fiber 114 in the micropipette 103.

Figure 6:
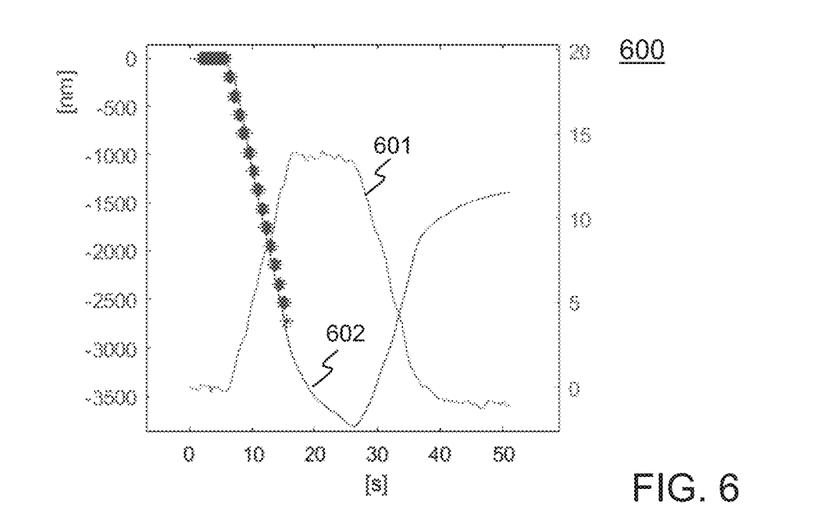
FIG. 6 is a composite graph of a measured stimulus-response relationship between relative pressure in the micropipette and displacement of an aspired portion of the sample in the micropipette, wherein both are plotted against time.

FIG. 6 illustrates a measured stimulus-response relationship 600 between relative pressure in the micropipette 103 and displacement of the aspired portion of the sample 101 in the micropipette 103. FIG. 6 is a composite graph having a horizontal axis, which represents time in units of seconds [s]. A right-hand vertical axis represents the relative pressure in units of detection signal level. A left-hand vertical axis represents the displacement in units of nanometer [nm].

FIG. 6 comprises two curves 601, 602. A first 601 curve represents a measurement of the relative pressure in the micropipette 103, which varies with time due to a pressure variation imposed by the syringe pump 104. This is the stimulus. A second curve 602 represents a measurement of the displacement of the aspired portion of the sample 101 in the micropipette 103. The displacement of the aspired portion of the sample 101 in the micropipette 103 varies with the relative pressure in the micropipette 103. This is the response. The relative pressure and the displacement are inherently concomitantly measured. The relative pressure is derived from a measured variation in the optical path length "a" of the pressure-sensing Fabry-Perot cavity 305 that is measured. The displacement is derived from a measured variation in the optical path length "c" of the aspiration Fabry-Perot cavity 404 and the refractive index of the fluid in the tip 112.

Figure 7:
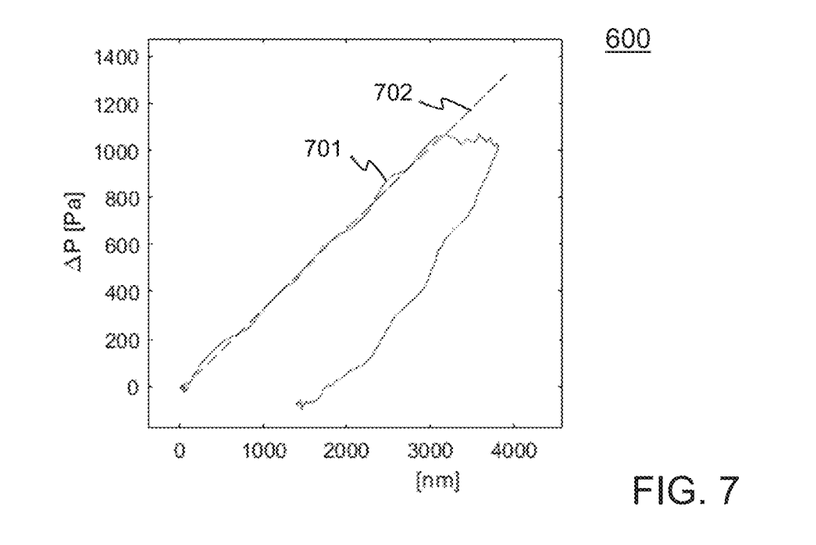
FIG. 7 is a simple graph of the measured stimulus-response relationship between the relative pressure in the micropipette and the displacement of the aspired portion of the sample in the micropipette, wherein one is plotted against the other.

FIG. 7 illustrates the same stimulus-response relationship 600 in a different manner. FIG. 7 is a graph having a horizontal axis, which represents the displacement of in units of nanometer [nm]. A vertical axis represents the relative pressure $\Delta P$ expressed in units of Pascal [Pa]. FIG. 7 comprises a solid line curve 701 that represents the stimulus-response relationship 600 that is also represented, but differently, in FIG. 6. FIG. 7 further comprises a straight broken line curve 702 that represents a linearized version of a so-called Zhou model for determining an elastic modulus E. The elastic modulus E can be determined on the basis of the following equation:

$$\frac{\Delta P}{E} = \frac{\beta_1 \left[1 - (R_p/R_c)^{\beta_3}\right]}{3} \frac{L_p}{R_p}$$

in which $\Delta P$ represents a differential pressure, Lp the displacement of the aspired portion of the sample 101 in the micropipette 103, $R_p$ the radius of the tip aperture 113, $R_c$ the radius of the sample 101, $\beta_1=2.0142$, and $\beta_3=2.1197$.

The optical measurement system 100 described hereinbefore with reference to FIGS. 1-7 allows studying frequency-dependent sample viscoelasticity. To that end, the syringe pump 104 may impose sinusoidal pressure variations of different frequencies in the micropipette 103 as stimuli. In response to a sinusoidally varying pressure, the sample 101 will exhibit a sinusoidally varying deformation, such as, for example a sinusoidally varying displacement of the aspired portion of the sample 101 in the micropipette 103. Due to viscous characteristics of the sample 101, the sinusoidally varying displacement will be out of phase with the sinusoidally varying pressure. There will be a phase lag between these two, which may be frequency dependent.

Figure 8:
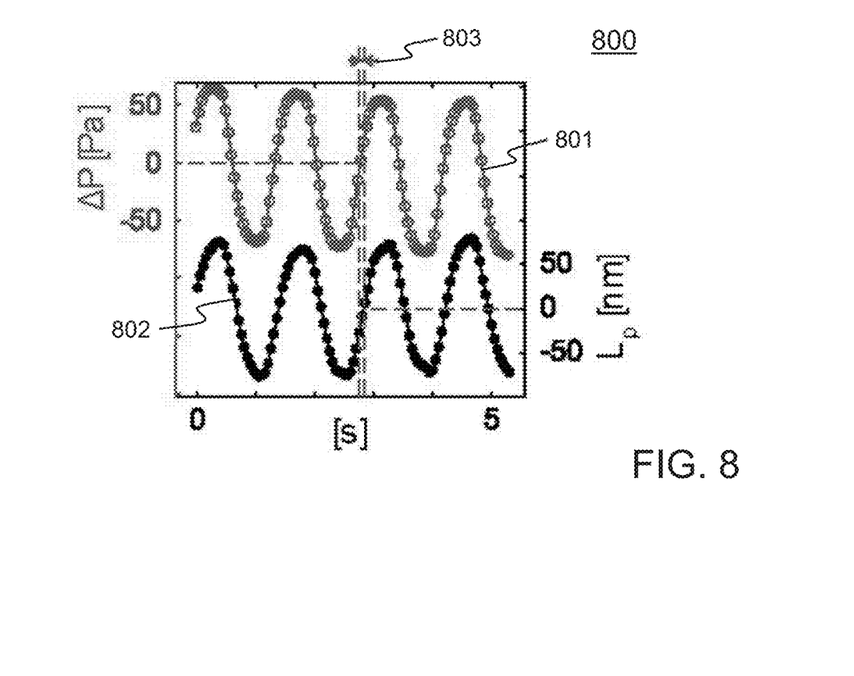
FIG. 8 is a composite graph of a measured stimulus-response relationship between a sinusoidally varying pressure in the micropipette and a sinusoidally varying displacement of an aspired portion of the sample in the micropipette, wherein both are plotted against time.

FIG. 8 illustrates a measured stimulus-response relationship 800 between a sinusoidally varying pressure in the micropipette 103 at a frequency of 0.75 Hz and a sinusoidally varying displacement of the aspired portion of the sample 101 in the micropipette 103. FIG. 8 is a composite graph having a horizontal axis, which represents time in units of seconds [s]. A left-hand vertical axis represents the relative pressure $\Delta P$ in units of Pascal [Pa]. A left-hand vertical axis represents displacement $L_p$ in units of nanometer [nm].

FIG. 9 comprises two sinusoidal curves: an upper sinusoidal curve 801 and a lower sinusoidal curve 802. The upper sinusoidal curve represents 801 a measurement of the sinusoidally varying pressure in the micropipette 103. The lower sinusoidal curve 802 represents a measurement of the sinusoidally varying displacement of the aspired portion of the sample 101 in the micropipette 103. FIG. 8 indicates a phase lag 803 between these two curves 801, 802. The phase lag is 803 thus measured for the aforementioned frequency of 0.75 Hz. Different phase lags may be measured for different frequencies due to frequency-dependent sample viscoelasticity as mentioned hereinbefore.

The phase lag 803 that is measured allows determining a storage modulus E' and a loss modulus E", which are viscoelastic properties the sample 101. The storage modulus E' may be determined on the basis of the following equation:

$$E' = \frac{3R_p}{\beta_1\left[1 - (R_p/R_c)^{\beta_3}\right]} \cdot \frac{P_O}{L_O} \cdot \cos(\delta)$$

in which δ represents the phase lag 803 discussed hereinbefore and illustrated in FIG. 8, $P_0$ represents the average pressure of the fluid in the tip 112 of the micropipette 103, and $L_0$ represents the average length of the aspired portion of the sample 101 in the micropipette 103, the other factors being as defined hereinbefore with respect to the equation relating to the elastic modulus.

The loss modulus E" may be determined on the basis of the following equation:

$$E'' = \frac{3R_p}{\beta_1\left[1 - (R_p/R_C)^{\beta_3}\right]} \cdot \frac{P_o}{L_o} \cdot \sin(\delta)$$

Figure 9:
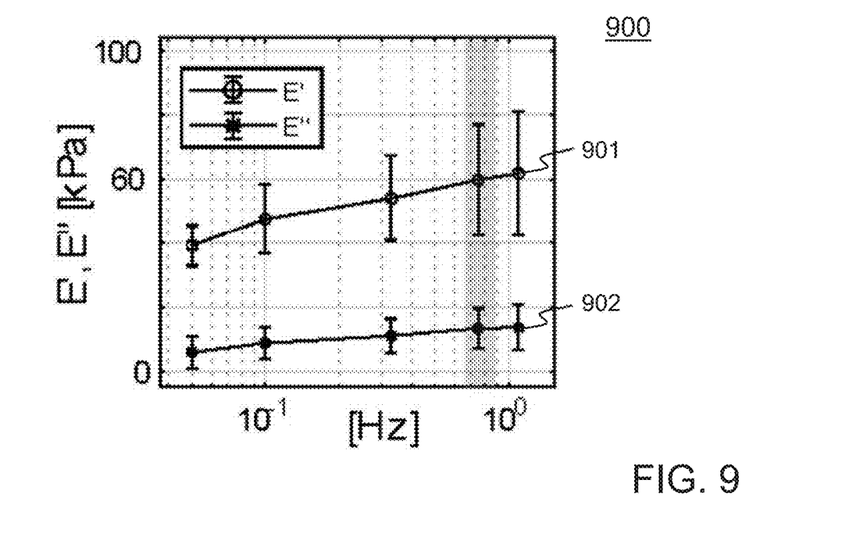
FIG. 9 is a graph of a measured frequency-dependency of a storage modulus E' and a loss modulus E" based on measured stimulus-response relationships as the one illustrated in FIG. 8.

FIG. 9 illustrates a measured frequency-dependency 900 of the storage modulus E' and the loss modulus E" based on measured stimulus-response relationships as the one illustrated in FIG. 8. FIG. 9 is a graph having a horizontal axis, which represents frequency in units of Hertz [Hz]. A vertical axis represents pressure in units of kilopascal [kPa]. FIG. 9 comprises two sinusoidal curves: an upper curve 901 and a lower curve 902. The upper curve 901 represents the storage modules E', which is frequency dependent. The lower curve 902 represents the loss modulus E", which is also frequency dependent. The aforementioned curves 901, 902 have been obtained on the basis of different phase lags measured at different frequencies with which sinusoidally varying pressure variation are imposed on the fluid in the tip 112 of the micropipette 103. The different frequencies comprise 0.05 Hz, 0.1 Hz, 0.35 Hz, 0.75 Hz, and 1 Hz as indicated in FIG. 9.

The measured stimulus-response relationship 800 illustrated in FIG. 8 and the measured frequency-dependency 900 of the storage modulus E' and the loss modulus E" illustrated in FIG. 9 were obtained with the sample 101 being a bovine oocyte to assess the frequency-dependent rheological properties of the Zona Pellucida. at a fixed temperature of 37.0° C. A preload suction pressure of 1500 Pa was applied to the micropipette 103. After a delay of 10 seconds, a series of 5 different sinusoidal pressure variations at the aforementioned frequencies of 0.05 Hz 0.1 Hz, 0.35 Hz, 0.75 Hz, and 1 Hz, respectively. Each sinusoidal pressure variation comprised 5 oscillatory periods of 60 Pa amplitude, A delay of 2 seconds was provided between two successive sinusoidal pressure. The storage modulus E' and the loss modulus E" thus measured, illustrated in FIG. 9, show a power-law rheological behavior, in accordance with what has been observed in several other biological systems.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to optically measuring deformation of a sample in response to a change in an environmental condition. In the embodiments presented hereinbefore, a sample deforms in response to a change in pressure. In other embodiments, an environmental condition other than pressure may change and cause deformation, such as, for example, temperature or radiation, including light. well as other environmental conditions.

There are numerous different ways of implementing a support for receiving a sample and for removably holding the sample in an optical sensing device in accordance with the invention. In the embodiments presented hereinbefore, the support is in the form of a tip of a micropipette. In other embodiments, the support may have a different form, such as, for example, a microfluidic channel or a MEMS device with an opening, MEMS being an acronym for Micro Electro-Mechanical System.

What is more, a method of optically measuring a response of a sample to a change in an environmental condition in accordance with the invention, need not make use of an optical sensing device having a support in the form of a micropipette. The sample may be free floating or may be retained by an element separate from an optical waveguide used for optically measuring a response of the sample to a change in an environmental condition. There are numerous setups that allow placing a sample so that a refractive index discontinuity at a surface of the sample faces an end of an optical waveguide, whereby the end of the optical waveguide and the refractive index discontinuity form an optical interferometric cavity.

For example, a miniature device that is functionally equivalent to a micropipette may be manufactured by means of optical lithography. Such a miniature device may be more suited for measuring relatively small samples than a micropipette. For example, a relatively small sample may require a micropipette having a tip aperture of a few microns only and thus a relatively narrow tip. In such a case, the relatively narrow tip may make that an end of an optical fiber, which is fitted therein, is relatively distant from the sample. This relatively large distance may complicate achieving a satisfactory signal-of-noise, and thus satisfactory accuracy and precision, or may even make this impossible. The aforementioned miniature device may provide a solution to this problem.

There are numerous different ways of implementing an optical interferometric cavity in an optical sensing device in accordance with the invention. In the embodiments presented hereinbefore, the optical interferometric cavity is a Fabry-Perot cavity. In other embodiments, the optical interferometric cavity may be, for example, a Michelson cavity.

There are numerous different ways of implementing an optical waveguide in an optical sensing device in accordance with the invention. In the embodiments presented hereinbefore, the optical waveguide is an optical fiber. In other embodiments, the optical waveguide may be comprised in an integrated photonics system.

There are numerous different ways of implementing an optical measurement system in accordance with the invention. In the embodiments presented hereinbefore, an optical measurement system comprising a single optical sensing device only was described for the sake of simplicity, the optical sensing device being in the form of a micropipette. In other embodiments, an optical measurement system may comprise multiple optical sensing devices jointly coupled to an optical interrogator. In such an embodiment, respective optical interferometric cavities formed with respective samples may have respective nominal optical path lengths that are sufficiently different so as to allow making a distinction between these in the optical interrogator. Patent publication WO2017077138A1 describes such a multiplex optical interrogation technique. This allows for more elaborate experiments, such as cell-cell adhesion studies.

There are numerous different ways of measuring a spectral response of an optical interferometric cavity in an optical measurement system in accordance with the invention. In the embodiments presented hereinbefore, an interrogator comprises a relatively broad band light source and a spectrometer-based analyzer. In other embodiments, an interrogator may comprise a relatively narrow band tunable light source, which is made to sweep throughout a wavelength band of interest. Furthermore, the spectral response may be analyzed using a technique different from that described in patent publication WO2017077138A1, although the technique described in this patent publication allows relatively high accuracy and precision in measuring variations in optical path length.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. A method of optically measuring a response of a sample to a change in an environmental condition to which the sample is exposed, wherein use is made of an optical sensing device comprising:
   a support with an aperture, the optical sensing device being adapted to removably hold the sample against the support around the aperture so that a portion of the sample is free to deform through the aperture; and
   an optical waveguide fixedly arranged with respect to the support whereby an end of the optical waveguide faces the aperture,
   the method comprising:
      forming an optical interferometric cavity between, one the one hand, the end of the optical waveguide and, on the other hand, a refractive index discontinuity at a surface of the portion of the sample, which is free to protrude through the aperture, the optical interferometric cavity having an optical path length;
      changing the environmental condition to which the sample is exposed so as to cause deformation of the portion of the sample through the aperture; and
      measuring a variation in the optical path length of the optical interferometric cavity in response to the change in the environmental condition.

2. A method of optically measuring a response of a sample according to claim 1, wherein the support forms an additional optical waveguide that is optically coupled to the optical interferometric cavity.

3. A method of optically measuring a response of a sample according to claim 1, further comprising transferring pressure variations to the aperture in the support.

4. A method of optically measuring a response of a sample according to claim 3, further comprising sensing by means of an optical pressure sensor the pressure variations that are transferred to the aperture in the support.

5. A method of optically measuring a response of a sample according to claim 1, further comprising:
   measuring successive spectral responses from the optical interferometric cavity in successive time intervals;
   identifying a periodicity in at least one of the successive spectral responses spectral response that have been acquired;
   detecting a change in the periodicity that has been identified, the change occurring throughout the successive spectral responses; and
   deriving the variation in the optical path length of the optical interferometric cavity from the change in the periodicity that has been detected.

6. A method of optically measuring a response of a sample according to claim 5, further comprising:
   detecting a phase evolution of the periodicity throughout the successive spectral responses, the phase evolution representing the variation in the optical path length of the optical interferometric cavity.

7. An optical measurement system comprising:
   a support with an aperture, the optical sensing device being adapted to removably hold a sample against the support around the aperture so that a portion of the sample is free to deform through the aperture;
   an optical waveguide fixedly arranged with respect to the support whereby an end of the optical waveguide faces the aperture so that the end is adapted to form an optical interferometric cavity with a refractive index discontinuity at a surface of the portion of the sample that is free to deform through the aperture; and
   an actuator for changing an environmental condition to which the sample is exposed so as to cause deformation of the portion of the sample through the aperture.

8. An optical measurement system according to claim 7, wherein the end of the optical waveguide comprises an optical lens.

9. An optical measurement system according to claim 8, wherein the optical lens is formed by a graduated refractive index at the end of the optical waveguide.

10. An optical measurement system according to claim 9, wherein at least a portion of the optical waveguide that comprises the end thereof is concentrically disposed in the support.

11. An optical measurement system according to claim 7, the optical sensing device being in the form of a micropipette.

12. An optical measurement system according to claim 7, wherein the optical waveguide comprises an optical fiber.

13. An optical measurement system according to claim 7 further comprising:
   an optical interrogator adapted to measure a spectral response of the optical interferometric cavity in the optical sensing device, to detect a periodicity in the spectral response that has been measured, and to derive an optical path length in the optical interferometric cavity from the periodicity that has been detected in the spectral response.

14. An optical measurement system according to claim 13, wherein the optical interrogator is adapted to measure successive spectral responses of the optical interferometric cavity in successive time intervals, to detect a phase evolution of the periodicity throughout the successive spectral responses, the phase evolution representing a variation in the optical path length.

15. An optical measurement system according to claim 7, wherein the actuator is adapted to induce a change in pressure exerted on the portion the sample that is free to deform through the aperture.

* * * * *